(12) United States Patent
Van Der Plas (10) Patent No.: US 7,118,268 B2
(45) Date of Patent: Oct. 10, 2006

(54) UNDERCARRIAGE FOR FODDER MIXING WAGON

(75) Inventor: Nicolaas Van Der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 235 days.

(21) Appl. No.: 10/753,209

(22) Filed: Jan. 6, 2004

(65) Prior Publication Data

US 2004/0163577 A1    Aug. 26, 2004

(30) Foreign Application Priority Data

Jan. 28, 2003    (DE)    ............................ 203 01 276 U (51) Int. Cl.
   *B01F 7/24*   (2006.01)
   *B60G 3/20*   (2006.01)
(52) U.S. Cl. .................. 366/314; 366/603; 280/124.11
(58) Field of Classification Search ................ 366/141, 366/266, 301, 302, 306, 307, 314, 318–324, 366/603; 280/124.11, 124.111; 241/101.76, 241/101.761, 101.8, 260.1, 605
   See application file for complete search history.

(56) References Cited

U.S. PATENT DOCUMENTS

| | | | | |
|---|---|---|---|---|
| 5,175,917 A | * | 1/1993 | Faccia | |
| 5,429,436 A | * | 7/1995 | Stone | 366/141 |
| 5,553,937 A | * | 9/1996 | Faccia | 366/603 |
| 5,553,938 A | * | 9/1996 | Faccia | 366/302 |
| 6,890,092 B1 | * | 5/2005 | Tamminga | 366/314 |
| 6,983,902 B1 | * | 1/2006 | Faccia | 241/101.761 |

FOREIGN PATENT DOCUMENTS

DE    10348206 A1 *    5/2005

* cited by examiner

*Primary Examiner*—Charles E. Cooley
(74) *Attorney, Agent, or Firm*—Darby & Darby (57) ABSTRACT

A fodder mixing wagon including a fodder mixing container equipped with at least one vertical auger above the bottom region, and including an undercarriage having a chassis and ground wheels, is provided with an active adjusting system for adjusting the fodder distribution within the mixing container in at least two opposed directions being substantially parallel to the bottom region, the adjusting system being equipped with at least one sensor arrangement for detecting either the actual fodder weight distribution within and/or the inclination of the mixing container. The adjusting system allows to actuate actuators for adjustable counter blades provided in the mixing container and/or mixing container/slanting devices, respectively.

6 Claims, 7 Drawing Sheets

UNDERCARRIAGE FOR FODDER MIXING WAGON

FIELD OF THE INVENTION

The invention relates to a fodder mixing wagon of the type as disclosed in the preamble part of claim 1 or of parallel claim 18.

BACKGROUND OF THE INVENTION

A self-propelled fodder mixing wagon as known from DE 20 005 671 O is provided with a mixing container with two vertical augers on a running undercarriage of a conventional truck. The mixing container is tiltably connected to the chassis frame of the undercarriage via a lateral axis in order to unload fodder through the rear delivery opening. The mixing container comprises a weighing device by which the filled in fodder is weighed and recorded. A horizontal conveyor may be provided at the delivery region.

The mixing container of a dragged fodder mixing wagon known from EP 0 387 547 A is set on the chassis frame of a uniaxial undercarriage.

The enforced container bottom of a fodder mixing wagon known from U.S. Pat. No. 5,429,436 A is set on an intermediate frame. The intermediate frame rests by blocks and suspension parts on the axle tube of a uniaxial wheel undercarriage. Only one vertical auger is provided in the mixing container. The weighing system of the fodder mixing wagon has two weighing members below the mixing container and one weighing member at the towing bar.

In the mixing container of the fodder mixing wagon known from DE 20 201 339 U three vertical augers are provided in the mixing container one behind the other in longitudinal direction. The mixing container is provided on a tractor towed undercarriage.

Particularly in the case of long fodder mixing wagons containing several vertical augers it is difficult to maintain the mixing container in a horizontal position. When the mixing container is inclined, the fodder locally is split outwardly during the mixing procedure. A uniform distribution of the fodder within the mixing container hardly can be achieved when the mixing container is inclined, even if only synchronously adjustable counter knives are provided in the mixing container (EP 0 7 04 153A, EP 0 704 154 A). Moreover, an inclined position of the mixing container is interfering in uncontrolled fashion with a per se predetermined circulation of the fodder during the mixing process and with the delivery of the fodder in a desired direction. Furthermore, such long fodder mixing wagons have, due to their design, an undesirably high dead weight. Since the allowable axle load is limited in most countries, e.g. to 10 tons, in many cases a multi-axle undercarriage is needed distributing the dead weight onto several axes and thus allowing a higher maximum weight. In such cases until now a separate intermediate frame is used for the mixing container. The intermediate frame is heavy due to its large dimensions. The intermediate frame is suspended on the chassis of the undercarriage. Due to the needed lateral conveyor a more compact design is not possible since the conveying device has to be positioned above the chassis. This reduces the load capacity to an undesirable extent. Because of the size of the mixing chamber the bottom region is long, e.g. 8.0 m, such that the bottom region hardly can be kept horizontal when the mixing wagon stands or travels on the ground.

OBJECT OF THE INVENTION

It is an object of the invention to provide a fodder mixing wagon of the kind as mentioned at the beginning which allows to avoid the above-mentioned drawbacks and which allows, particularly when equipped with several augers, an optimum distribution of the fodder at least during the mixing process, i.e. an optimum distribution avoiding spilling the fodder.

BRIEF DESCRIPTION OF THE INVENTION

The adjusting system of the fodder mixing wagon allows to adjust the bottom region of the mixing container relatively precisely horizontally and/or to individually actuate the counter knives depending on the actual inclination of the mixing container or the actual weight distribution, even in the case of an ascending or descending and/or sidewardly sloping ground, in order to achieve an optimum fodder distribution within the mixing container during the mixing process and to prevent that the fodder locally is split outwardly. The slanting devices allow, e.g. on inclined ground, to slant the bottom region into each direction in order to achieve a determined distribution or circulation of the fodder during the mixing process or even an intended fodder displacement to the respective delivery region as planned for the delivery, in some cases even assisted by individually adjusted counter knives.

In this case the core of the invention is to either adjust the mixing container slanting position by means of the slanting devices depending on the detected actual inclination or to selectively control the fodder distribution depending from the detected actual inclination or the detected actual weight distribution in the mixing container, respectively, with the help of the individually controlled counter knives, in order to achieve a uniform fodder distribution in the mixing container and to prevent spilling the fodder. For this purpose, so to speak, an on-board adjusting system is used which is integrated into the fodder mixing wagon. In some cases the fodder distribution even may be controlled by a combination of both measures, i.e., with the help of the individual influence of the counter knives and the adjustment of the inclination of the mixing container. Even in case of a long fodder mixing wagon spilling the fodder during mixing can be avoided in this way. When applying one measure or both measures, respectively, selectively an intended displacement of the fodder in the mixing container can be achieved, e.g. to assist the fodder delivery to the exterior.

The invention also achieves a large fodder mixing wagon having a compact design and an advantageous ratio between load capacity and total weight.

The bottom region of the mixing container is, according to the invention, a substantially even, thin sheet metal bottom having enforcing longitudinal beams at the lower side. The bottom region is suspended on the tridem-undercarriage via supports which, preferably, contain weighing members. By means of the enforcing longitudinal beams, and in some cases by means of lateral enforcing beams extending crosswise to the longitudinal enforcing beams, even in case of a large fodder mixing wagon a sufficient stability of the thin walled bottom region is achieved, particularly in the regions of the auger mounting areas. The supports mounted to the enforcing beams are directly suspended on the undercarriage, however, as low as possible, such that a heavy and space-consuming intermediate frame is dispensed with.

In one embodiment the inclination of the mixing container is adjusted by means of the adjusting system about at least one, in some case, virtual, lateral axis and/or one, in some cases, virtual, longitudinal axis in relation to the ground or even in relation to the chassis of the undercarriage, either in order to achieve a uniform fodder distribution within the mixing container or to achieve an intended fodder displacement, e.g. towards a certain delivery opening of the mixing container. It may suffice in practice to carry out adjustments only about the lateral axis. In case of an optimised fodder mixing wagon the mixing container even may be adjusted about both axes.

The undercarriage at least has two axes, preferably even three axes, in order to uniformly distribute a high total weight.

Structurally simple the mixing container either is adjusted together with the chassis of the undercarriage or relative to the chassis. In any case the wheels will stay in contact with the ground.

In order to force a uniform mixing process with uniform fodder distribution and to avoid spilling the fodder, the bottom region of the mixing container is adjusted into a horizontal position by means of the adjusting system and about the lateral axis and/or the longitudinal axis, e.g. depending on the inclination of the ground. This may, if desired, be carried out fully automatically, so that the wagon personnel does not need to attend to this.

Alternatively, the bottom region is tilted by means of the adjusting system in relation to an arbitrarily inclined ground about the lateral axis and/or the longitudinal axis in relation to a horizontal position, e.g., in order to established a determined circulation during the mixing process, or to assist the delivery process in the selected delivery region which then is brought in the lowest position.

The adjusting system comprises at least one mechanic, pneumatic, hydraulic or electric actuator for a counter knife or a slanting device, respectively, which actuator, preferably, is actuated fully automatically, semi-automatically, or manually.

In a structurally simple fashion the actuator is arranged between a first suspension location fixed to the chassis and a movable second suspension location which can be fixed in relation to the ground. In case of a tractor towed fodder mixing wagon the second suspension location may be the coupling to the tractor. In case of a self-propelled fodder mixing wagon, to the contrary, the second suspension location may be provided at a random location in the fodder mixing wagon instead or even may be intentionally fixed in relation to the ground. In case of a tractor towed mixing wagon a tow bar is movably provided at the chassis. The tow bar defines the second suspension location and has a tractor coupling. During the adjustment of the mixing container the adjustment reaction forces will be taken up by the tractor.

In an expedient embodiment the at least one actuator of the slanting devices is provided between the chassis and the mixing container. For this purpose, e.g. air spring bellows or hydraulic bellows may be particularly useful. The total adjustment range ought to be large enough so that the bottom region of the mixing container can be adjusted about the lateral axis and/or the longitudinal axis into a position above and below a plane which is substantially parallel to the chassis.

Expediently a chassis front end structure is provided at the chassis. The front end structure contains the first suspension location. The tow bar is linked to the front end structure to be pivoted about a bending axis which is parallel to the at least one axis of the undercarriage. The actuator is arranged with distance above or below the bending axis in order to have an advantageously long lever arm for the adjustments.

A feature of particular importance is an inclination sensor and/or a weight distribution weighing sensor being a part of the adjusting system. The sensor emits at least one indication. The actuator is actuated, preferably in case of an automatic operation, under consideration of the indication of the sensor in order to carry out the respective needed adjustment of the mixing container in relation to the ground and/or the adjustment of the counter blade. By means of the slanting device adjustment movements are possible in each direction about the in some cases only virtual lateral axis and/or in some cases only virtual longitudinal axis in order to achieve the optimum position of the bottom region of the mixing container independent from an upwardly or downwardly or sidewardly inclined ground. Alternatively or additively, the counter blades are adjusted individually, in order to achieve a uniform fodder distribution.

The inclination sensor may comprise a sort of a water level, the indicator of which is scanned automatically in order to produce the indication used for the adjustment, or the indicator of which is observed visually when manually adjusting, e.g. the mixing container into the horizontal position. The indicator of the water level can be completed by a graduation such that desired tilted positions can be adjusted.

The adjustment of the mixing container, however, alternatively or additively, may be carried out with the help of measuring results of several, preferably four, weighing members of the weighing sensor which measuring results represent any irregular distribution of the fodder within the mixing container. By comparing the weight measurements of the weighing members the needed indication for the actuation of the respective actuator can be derived easily. Furthermore, the inclination sensor and/or the weighing sensor also may provide the parameters needed for the individual adjustment of the counter blades.

The sensor or an indicating display of the sensor is located advantageously there where it can be checked comfortably by the personnel while sitting in the tractor.

The adjusting system comprises a preferably electronic and computerised control device and actuating device for comfortable handling by the wagon driver.

The control and actuating device may be provided at the fodder mixing wagon directly, or alternatively, at the tractor, or even is a mobile device which is portable in relation to the tractor and/or the fodder mixing wagon. In the latter case the wagon driver can carry out the adjustments at each arbitrarily selected position outside the tractor and/or the mixing wagon.

The control and actuation device ought to be provided with a selecting switch which can be adjusted in at least three switching positions. The first switching position is an automatic operation for adjusting a horizontal position by which the bottom region of the mixing container automatically is adjusted into a horizontal position or such that a uniform fodder distribution is adjusted. The second switching position may result in an automatic fodder displacement adjusting operation by which a desired inclination of the mixing container is adjusted automatically in relation to a horizontal position, preferably with or without influence of the counter knives. The third switching position allows manual adjusting operations which the wagon driver can carry out upon demand.

In a preferred embodiment at least one front side and a rear side counter blade is provided in the mixing container, preferably in the mixing container wall. The counter blades provided can be adjusted independently from each other or at least inversely in relation to each other. Expediently, the counter blades are provided pairwise and can be adjusted individually or inversely pairwise. As it is known in the field of mixing wagons, the counter blades co-operate during the mixing process with the vertical augers and gain influence on the mixing process and also on the fodder distribution within the mixing container. That influence of the counter blades in this case is intentionally used in order to adjust a uniform fodder distribution depending how the inclination of the mixing container or the actual load distribution is.

Preferably the tridem-undercarriage is equipped with two longitudinal beams. The supports either are provided as prolongations at the ends of the longitudinal beams or are provided sidewardly of the longitudinal beams, or even are provided on top of the longitudinal beams. Significant mounting heights can be saved if the supports are provided in the form of low-position prolongations at the ends of the longitudinal beams or if they provided at low positions and sideward from the longitudinal beams.

Within tridem-undercarriage spring suspension systems and/or air spring bellows and structurally associated supporting parts are provided between the axes and the longitudinal beams. The movability of the longitudinal beams in the spring systems or in the air spring bellows is used according to the invention to adjust the mixing container by means of the adjusting system in relation to the ground, while the wheels maintain contact with the ground.

In the case that air spring bellows are provided, the necessary adjustment of the inclination of the mixing container even may be carried out by individually actuating or relieving the air spring bellows by pressurised air. The air spring bellows in this case, so to speak, define pneumatic actuators of the slanting devices of the adjusting system.

A very lightweight structure is achieved if the tridem-undercarriage comprises a first pair of tandem rockers for first and second axes, and a second pair of tandem rockers for a third axis. In this case the second pair of tandem rockers is pivotally linked to the first pair of tandem rockers. The supports carrying the mixing container, in this case two supports may suffice, are mounted to the second pair of tandem rockers. The supports are equipped with the needed number of weighing members.

Expediently the wheels are mounted to the pairs of tandem rockers only by stud axes, i.e. without fully through-going axes, in order to further save weight and in order to achieve an undercarriage having large ground clearance between the wheels. At least the wheels of the first and third axes should be provided on steerable wheel hubs in order to achieve a better manoeuvrability of the fodder mixing wagon.

BRIEF DESCRIPTION OF THE DRAWINGS

Embodiments of the invention will be explained with the help of the drawing. In the drawing is:

FIGS. 2, 3, in related illustrations, a partially cut side view, a top view and a front view & 4 of a second embodiment of a fodder mixing wagon, FIGS. 5, 6 the fodder mixing wagon of FIGS. 2–4 towed by a tractor, shown in different & 7 operation positions, FIGS. 8 & 9 a view from below and a view from the rear side, respectively, of a tridem undercarriage as used for the fodder mixing wagon, FIG. 10 a perspective view of another embodiment of a tridem undercarriage, and FIG. 11 a side view of another mixing wagon.

Figure 1:
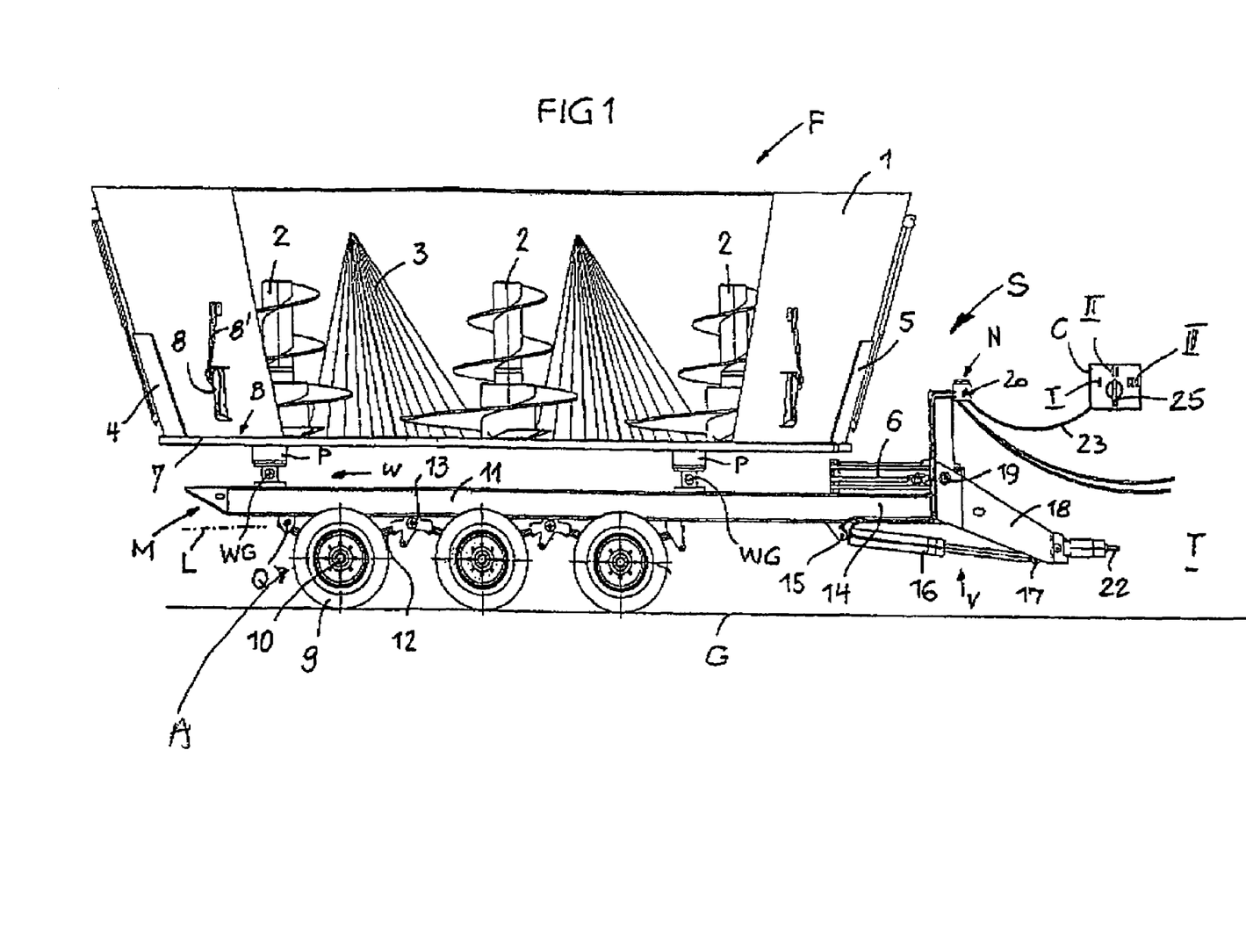
FIG. 1 a first embodiment of a fodder mixing wagon in a side view.
Figure 2:
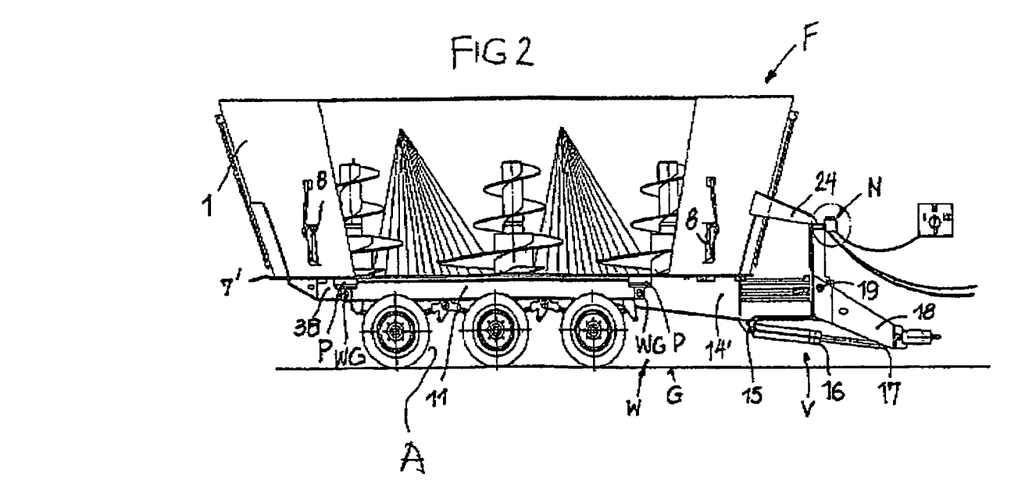
Figure 3:
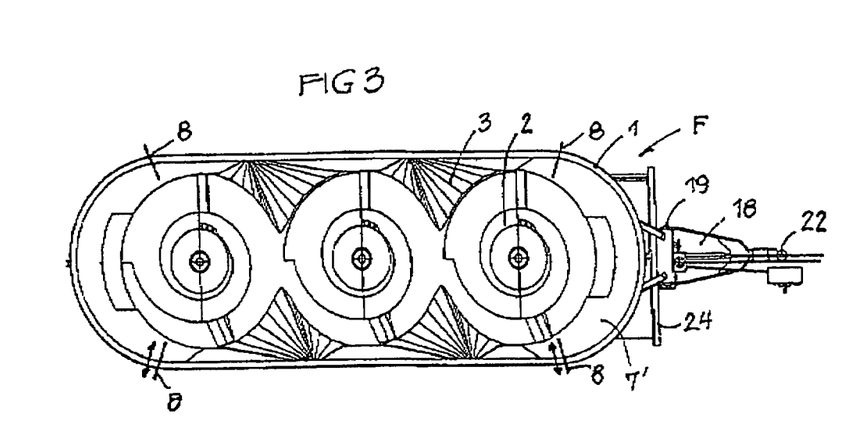
Figure 4:
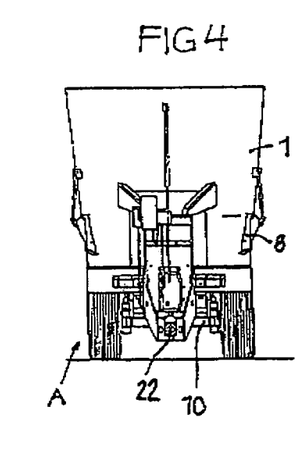

A fodder mixing wagon F coupled to a tractor T comprises in FIG. 1 a mixing container 1 having an even bottom region B. On top of the bottom region B three vertical conveying augers 2 are provided in rotatable fashion. The vertical augers 2 are separated from each other and are arranged one behind the other in longitudinal direction. Distributing cones 3 may be provided between the vertical conveying augers 2 at the side walls of the mixing container 1. At rear and front ends of the mixing container 1 delivery regions 4, 5 are provided including flaps which are adjustable by cylinders. Below the front delivery region 5 a lateral conveyor 6 is provided. Several counter blades 8 which can be adjusted by actuators 8' are provided in the wall of the mixing container 1. The counter blades 8 can be pivoted inwardly or can be pulled outwardly and can co-operate with the vertical conveying augers 2 for intensifying the mixing process and for intentionally distributing the fodder during mixing. Each counter blade defines a passage with the associated conveying auger or, within the circulation path of the fodder, respectively, which passage can be adjusted in its width. Depending on the adjustment of the counter blades the fodder during circulation will be retarded more or less and/or the fodder is controlled to rise upwardly.

The mixing container 1 has in this case an even, relatively thick sheet metal bottom 7 which is provided on an undercarriage A. In the shown embodiment the undercarriage A has three axes 10 each equipped with wheels 9. The axes 10 are connected via spring system 12 (or not shown air spring bellows) and movable suspension parts 13 with two longitudinal beams 11 which form a chassis M of the undercarriage A. In a not shown embodiment, instead, an intermediate frame could be provided between the bottom region B and the triaxial undercarriage A.

The bottom region B with the sheet metal bottom 7 is directly supported via supports P on the longitudinal beams 11. The supports P comprise weighing members WG. For example, totally four supports P each having a weighing member WG are provided (as can be seen best in FIGS. 8 and 9). The weighing members WG commonly define, e.g., a weight distribution sensor W of an adjusting system S.

The longitudinal beams 11 are prolonged into a chassis front end structure 14 on which the lateral conveyor 6 is provided. The chassis front end structure 14, furthermore, is provided at the lower side with at least a first suspension location 15 which is fixed to the chassis. A tow bar 18 pivotably is connected to the chassis front end structure 14 by means of a bending axis 19 which is parallel to the axes 10. The tow bar 18 has a tractor coupling 22 which defines a second suspension location 17 and which is movable about the bending axis 19. An actuator 16, e.g. a hydraulic cylinder, is inserted between the suspension locations 15 and 17. The actuator 16 is part of a mixing container slanting device V and belongs to the adjusting system S of the fodder mixing wagon F. Alternatively, the actuator 16 may be a mechanical, electrical or pneumatic actuator, respectively.

An inclination sensor N, e.g., is provided on the chassis front end structure 14, e.g. in the form of a sort of a water level 20. The inclination sensor N is connected via a cable 23 with a control and actuating device C of the adjusting system. The inclination sensor N emits a visual indication or transfers the indication to the device C, respectively. The control and actuating device C includes a selection switch 25 which can be adjusted between three positions I, II, III. The position I represents e.g. an automatic operation to adjust a horizontal position. The position II e.g. represents an automatic operation to adjust a certain fodder distribution. The position III represents e.g. a manual adjustment operation. The control and actuating device C, preferably, is of an electronic and/or computerised type such that fully automatic, semi-automatic or manual adjustment procedures can be carried out with the help of the adjustment system S.

In more detail, the adjustment system S allows to adjust the bottom region B of the mixing container 1 either in combination with or in relation to the chassis M about, in some cases, a virtual, lateral axis Q and/or in some cases, only virtual, longitudinal axis L in each direction, in order to either level the bottom region B into a horizontal position in case of inclined ground G, or to adjust the bottom region B into a desired tilted position in relation to a horizontal position and independent from an inclination of the ground G.

The adjusting system S, alternatively or additively, also allows to individually adjust the counter blades 8, provided that counter blades 8 are provided. The adjustment of the counter blades 8 e.g. is controlled under consideration of the indications of the sensors W and/or N, in order to control the fodder distribution within the mixing container 1 in intended fashion. This means that either e.g. during the mixing process adjustments are made to avoid spilling of the fodder to the outside, or to deliver the fodder outwardly in a selected direction. The invention is not limited to a fodder mixing wagon which has both the slanting device V as well as the individually adjustable counter blades 8. In some cases it might suffice to provide the fodder mixing wagon F with the adjusting system S and with the at least one slanting device, but without providing the counter blades 8 or the adjustable counter blades 8. In another case, where counter blades 8 are provided, the counter blades do not necessarily need to be included into the adjusting system S. On the hand, it is possible to equip the fodder mixing wagon F only with counter blades 8 which can be individually adjusted by means of the adjusting system S, while a slanting device is not provided at all.

The fodder mixing wagon F of FIGS. 2–7 differs from the fodder mixing wagon F of FIG. 1 by a more compact design and an improved ratio between the total width and the load capacity. A thin-walled light weight sheet metal bottom 7 comprising stiffening enforcing longitudinal beams 38 (e.g. two) in the bottom region B of the mixing container 1 is provided very close above the longitudinal beams of the tridem undercarriage A. Crosswise to the enforcing longitudinal beams 38 enforcing lateral beams (not shown) may be provided as well. The supports P, e.g. are prolongations of the ends of the longitudinal beams 11 and are located in lowered positions or even in sideward and lowered positions in relation to the longitudinal beams and carry the enforcing beams, e.g. 38, of the bottom region B. Furthermore, a chassis front end structure 14' may be provided which is fixed to the chassis and to the bottom and which is supported by struts 24 at the mixing container 1. The chassis front end structure 14' defines a support for the bending axis 19. In comparison with the embodiment of FIG. 1 the overall mounting height is reduced, because the supports P are provided in lowered positions. In some cases, counter blades 8 may be provided, which are incorporated into the adjusting system and which may be actuated individually.

Figure 5:
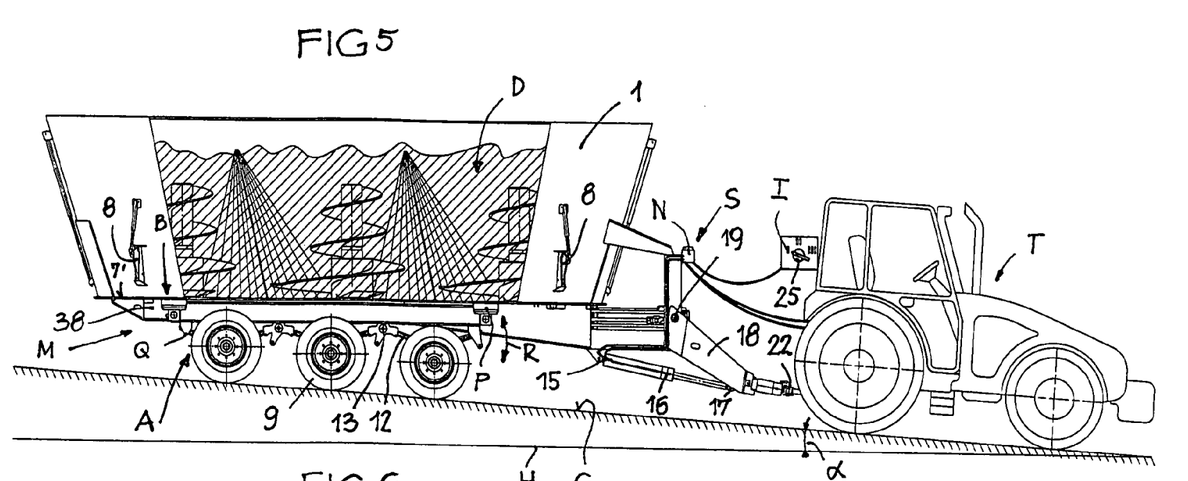

The bottom region B of the mixing container 1 is in FIG. 5 adjusted horizontally independent from a downward or upward slope α of the ground G in travelling direction and in relation to a horizontal plane H. This is carried out by means of the adjusting system S and with the help of the actuator 16. The mixing container 1 is adjusted in the spring system 12 of the undercarriage A about the virtual lateral axis Q using the movability in the spring system 12 such that the wheels 9 maintain their contact with the ground G. This is achieved by retracting the actuator 16 such the suspension locations 15, 17 approach each other and such that the tow bar 18 is tilted about the bending axis 19. That adjustment may be controlled manually by the driver who constantly observes the inclination sensor N or the indication of the inclination sensor N, or may be carried out fully automatically under consideration of the then varying indication of the inclination sensor N. Alternatively, that adjustment can be carried out in each direction R even by using the indication of the weight distribution sensor W and the weighing members WG, because the reading of the weighing members WG clearly represent any dislocation of the fodder D in the mixing container 1, e.g. caused by an inclined position of the mixing container. That adjustment then is carried out until all weighing members show substantially the same indication.

In case of an opposite slope of the ground G (an uphill slope) the adjustment of the bottom region B into a horizontal position is carried out by extending the actuator 16.

Figure 6:
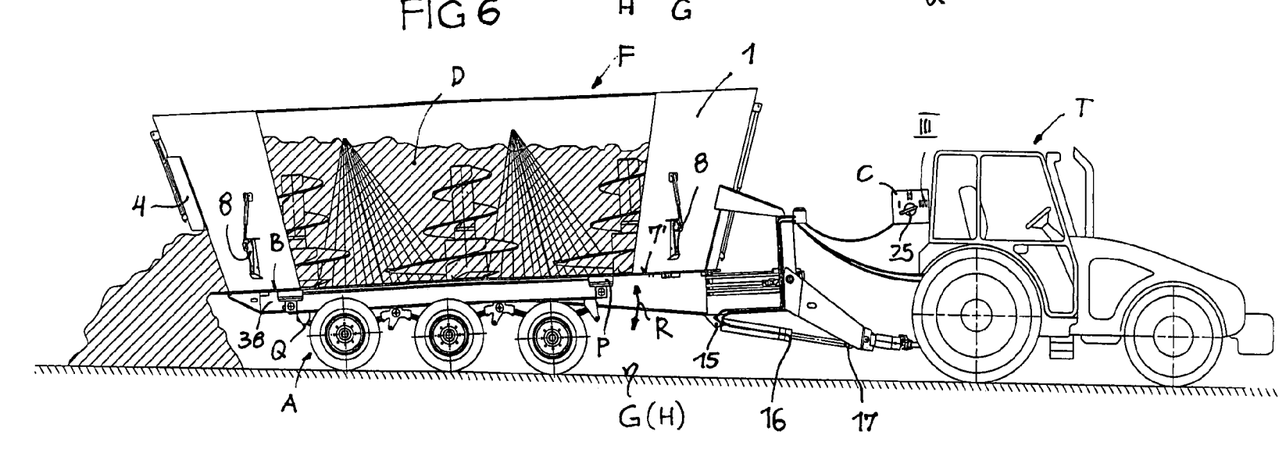

The bottom region B in FIG. 6 is tilted on an e.g. horizontal ground G about the virtual lateral axis Q to the rear in order to assist during the delivery or flow of the fodder D through the rear delivery region 4 (when the flap is opened). For this purpose, the actuator 16 is retracted. This may be carried out by manual control or by means of an automatic operation initiated from the side of the tractor T.

Figure 7:
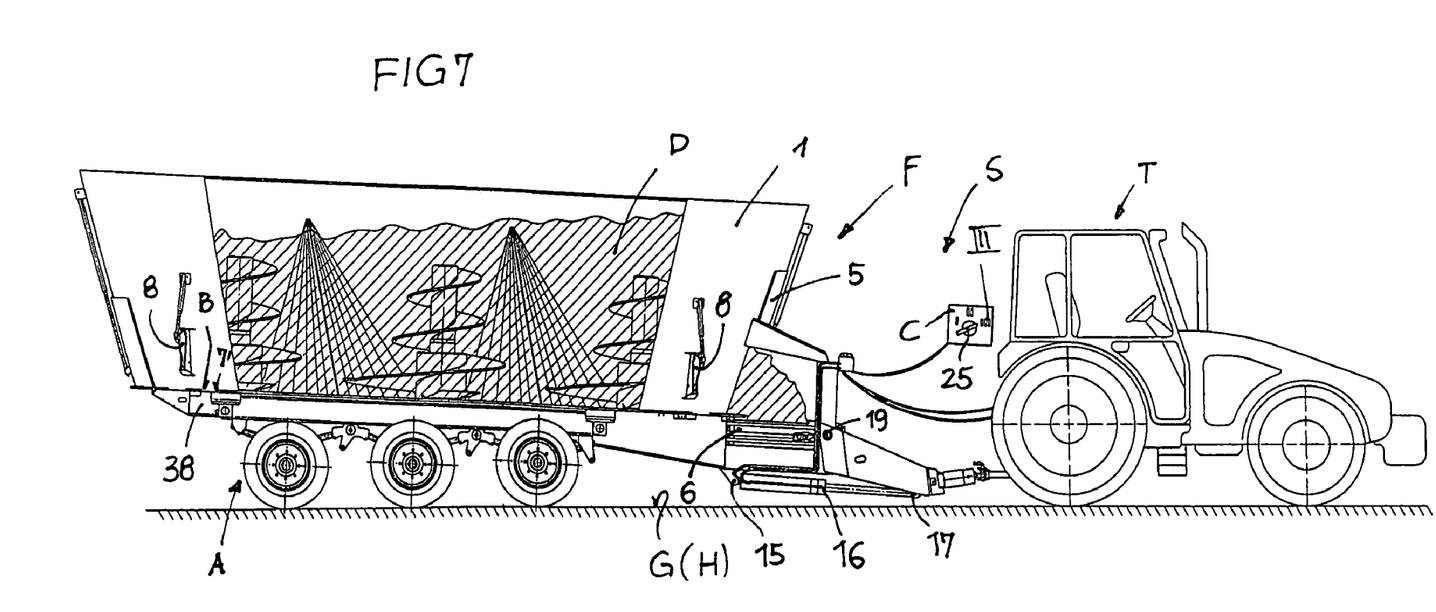

FIG. 7 illustrates the use of the adjusting system S for emptying the mixing container 1 through the front side delivery region 5 (when the flap is opened) and via the lateral conveyor 6. The bottom region B of the mixing container is tilted forwardly about a front side virtual lateral axis by extending the actuator 16.

Adjustment movements of the bottom region about the virtual longitudinal axis L (FIG. 1) are not shown. However, for this purposes, additional, not shown, actuators of the adjusting system S may be used, again using the movability in this spring systems of the undercarriage or by adjusting the mixing container 1 in relation to the chassis M (analogously to FIG. 11).

Figure 8:
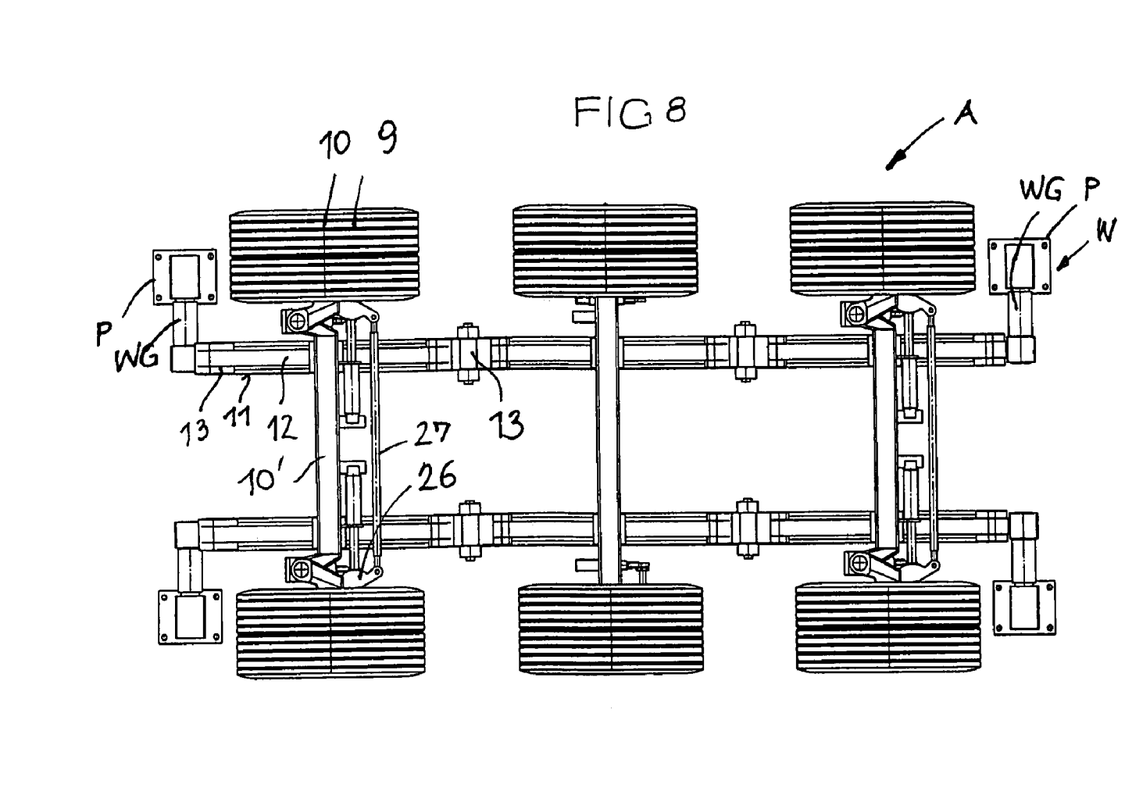
Figure 9:
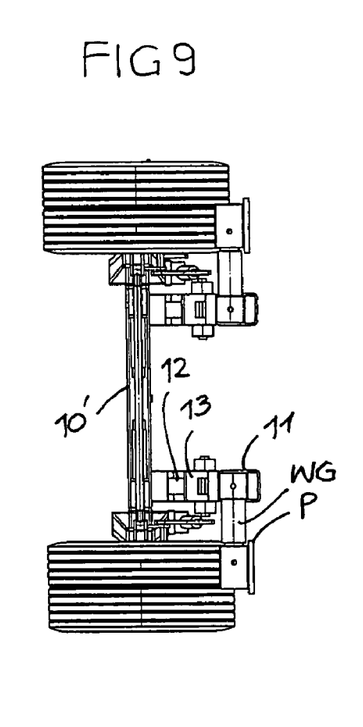

FIGS. 8 and 9 illustrate the tridem undercarriage of FIGS. 1–7 including both longitudinal beams 11 to which the supports P with the weighing members are mounted in the form of prolongations such that the four suspension points of the supports P form a rectangle. In this case, each support P extends outwardly from the associated longitudinal beam. In the tridem undercarriage A the respective wheels 9 are interconnected by axle parts 10. The front wheels and the rear wheels 9 have steering devices 26 including steering links 27.

Alternatively, the compact design of the fodder mixing wagon and/or the adjusting system S may be implemented as well into a self-propelled fodder mixing wagon.

Figure 10:
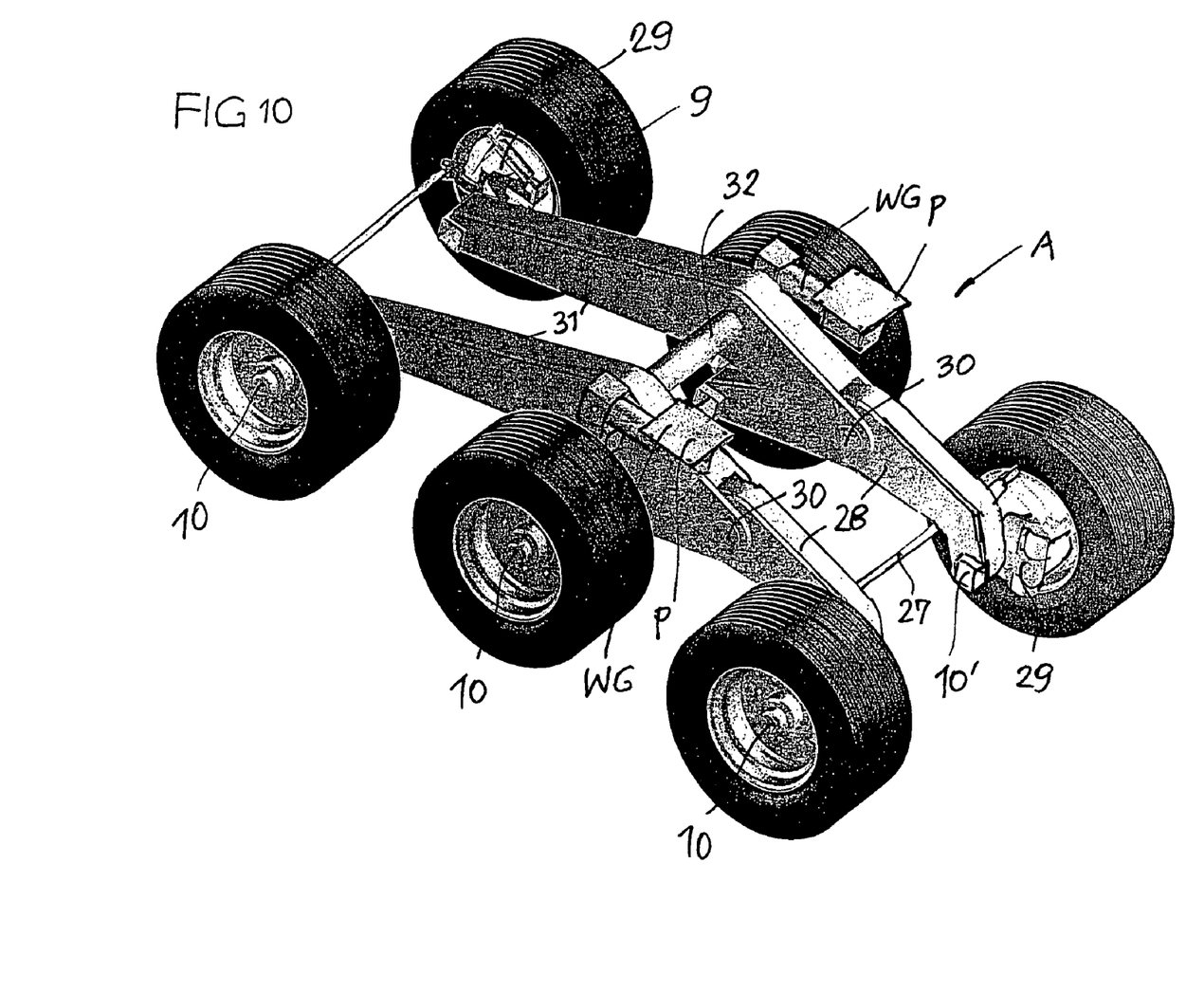

The tridem undercarriage shown in FIG. 10 is light and consists of few parts only. A first pair of tandem rockers 28 suspends the stud axes 10' of the first and second axes 10 with the wheels mounted thereon. A second pair of tandem rockers 31 is linked in linking locations 30 between the first and second axes at the first pair of tandem rockers 28. The rear ends of the pair of tandem rockers 31 supports the stud axes of the rear axis 10. The wheels 9 provided at the frontmost and the rearmost axes 10, respectively, comprise wheel hub steering devices 29. Each pair of steerable wheels 9 is coupled by a steering link 27. The supports P having their weighing sensors W are mounted between the ends of the second pair of tandem rockers 31. The tandem rockers 31 are interconnected by a lateral strut 32. The mixing container (not shown in FIG. 10) directly is put on the supports P. Adjustments of the mixing containers are carried out analogously to the preceding embodiments.

Figure 11:
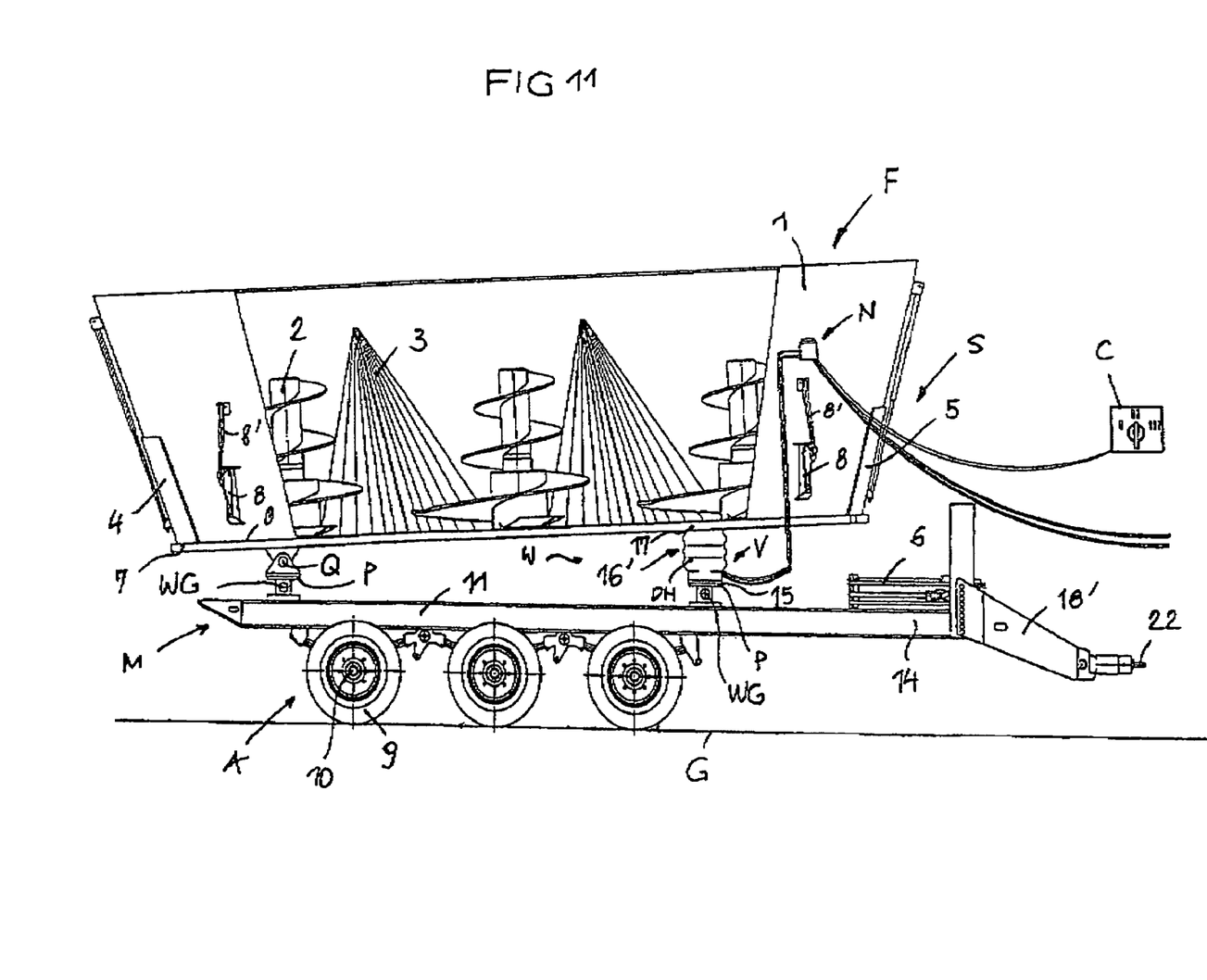

The fodder mixing wagon F as shown in FIG. 11 comprises the mixing container 1 having a relatively thick-walled bottom region B (thick-walled sheet metal bottom 7) which is suspended on the chassis M of the undercarriage A such that it can be adjusted at least about the lateral axis Q in both directions and in relation to the ground G or in relation to the chassis M into different inclined positions. The lateral axis Q in this case is not virtual but factual. Adjustments are carried out by an adjustment stroke which allows an adjustment of the bottom region in relation to a plane which is parallel to the chassis M and such that the bottom region will then be placed partially above or below that plane. The lateral axis Q rests on supports P which are suspended by means of weighing members WG on the longitudinal beams of the chassis M. The lateral axis Q, e.g., is situated close to the rear end portion of the fodder mixing wagon F. At least one actuator 16', e.g. an air spring bellows or hydraulic bellows DH, serving as slanting device V, is provided in the front end portion of the fodder mixing wagon F between the bottom 7 (defining a first suspension location 17 which is fixed to the mixing container) and the support P (defining a second suspension location 15 fixed to the chassis). The support P comprises the weighing member WG which may belong to a weight distribution weighing sensor W. The adjusting system S includes the inclination sensor N which is fixed to the mixing container and which is connected to the control and actuating device C in order to deliver indications representing the actual inclination of the mixing container 1, e.g. like a sort of a water level or with the help of the related or compared measurements of the weighing members WG. As shown, several counter blades 8 may be actuated by actuators 8' in the mixing container and may be incorporated into the adjusting system S. The chassis front end structure 14 carries the lateral conveyor 6 and also a tow bar 18' which is fixed to the chassis. The tow bar 18' has a tractor coupling 22. In case that the fodder mixing wagon F is standing on a ground G having a downhill slope (as shown), the bottom region B is adjusted into the horizontal position by extending the actuator 16' (in some cases there might be provided two actuators which are placed beside each other in lateral direction) in order to achieve a uniform fodder distribution within the mixing container 1. Alternatively or additively, the fodder distribution also may be influenced by individual actuation of the counter blades 8 via the adjusting system S, e.g. by moving the rearwardly positioned counter blades 8 in case of the shown inclination of the ground G further into the mixing container and by further pulling back the front side counter blades 8 in the mixing container, in order to compensate for the inclination of the ground and in order to adjust the uniform distribution of the fodder which avoids that fodder will be spilt to the outside over the upper edge of the mixing container 1.

In the embodiment of the fodder mixing wagon in FIG. 11 either the slanting devices V or the counter blades 8 may be actuated alone for influencing the fodder distribution by means of the adjusting system. However, expediently the measures carried out by both devices are combined.

Even though FIG. 11 only illustrates an adjustment of the mixing container 1 about the fixed lateral axis Q, it is to be noted that analogous adjusting devices also may be provided for adjusting the mixing container 1 about the not shown longitudinal axis. Also such adjusting devices then will be activated by means of the adjusting system S.

The invention claimed is:

1. Fodder mixing wagon comprising a fodder mixing container having a bottom region and at least two vertical conveying augers above the bottom region, the fodder mixing container being provided on the chassis of an undercarriage traveling on the ground by wheels, wherein the combination of the following features:
   a) the bottom region is defined by an essentially plane, thin-walled sheet metal bottom which is stiffened at its lower side at least by enforcing longitudinal beams;
   b) the undercarriage is a triaxial or tridem undercarriage; and
   c) the bottom region is suspended via supports on the tridem undercarriage, preferably via the enforcing beams.

2. Fodder mixing wagon as in claim 1, wherein the tridem undercarriage comprises two longitudinal beams, the supports either are arranged as a lowered prolongations at the ends of the longitudinal beams or are arranged in lowered positions sidewards of the longitudinal beams or are arranged on top of the longitudinal beams, respectively, and at least some of the supports provided are equipped with weighing members.

3. Fodder mixing wagon as in claim 2, wherein spring systems and/or air spring bellows and suspending parts are provided within the tridem undercarriage between each axis interconnecting two wheels and the longitudinal beams, and the longitudinal beams are designed for adjustments together with the suspension parts by means of a mixing container inclination adjusting system within the spring systems or the air spring bellows in relation to the axes about a lateral axis and/or about a longitudinal axis, respectively.

4. Fodder mixing wagon as in claim 3, wherein the adjustment of the longitudinal beams together with the suspension parts is carried out via the adjusting system by varying the actuation of the air spring bellows.

5. Fodder mixing wagon as in claim 1, wherein the tridem undercarriage comprises a first pair of tandem rockers for adjacent first and second axes and a second pair of tandem rockers for supporting a third axis, the second pair of tandem rockers being linked to the first pair of tandem rockers in pivotable fashion between the first and second axes, and that at least two supports, preferably each equipped with a weighing member, are provided for the mixing container at the second pair of tandem rockers between the third axis and the link points of the second pair of tandem rockers at the first pair of tandem rockers.

6. Fodder mixing wagon as in claim 5, wherein the wheels of the three axes are mounted to the pairs of tandem rockers by means of laterally separated stud axes and that at least the wheels of the first and third axes comprise steerable wheel hubs.

* * * * *